(12) United States Patent
Munger

(10) Patent No.: US 11,958,085 B2
(45) Date of Patent: Apr. 16, 2024

(54) METHOD AND DEVICE FOR PROCESSING BERRIES

(71) Applicant: Munger Bros., LLC, Delano, CA (US)

(72) Inventor: Kewel Munger, Delano, CA (US)

(73) Assignee: Munger Bros., LLC, Delano, CA (US)

( * ) Notice: Subject to any disclaimer, the term of this patent is extended or adjusted under 35 U.S.C. 154(b) by 1493 days.

(21) Appl. No.: 16/240,396

(22) Filed: Jan. 4, 2019

(65) Prior Publication Data
US 2019/0134675 A1    May 9, 2019

Related U.S. Application Data

(60) Division of application No. 14/788,085, filed on Jun. 30, 2015, now abandoned, which is a
(Continued)

(51) Int. Cl.
*B08B 3/02* (2006.01)
*A23B 7/154* (2006.01)
(Continued)

(52) U.S. Cl.
CPC .............. *B08B 3/022* (2013.01); *A23B 7/154* (2013.01); *A23B 7/157* (2013.01); *A23B 7/158* (2013.01);
(Continued)

(58) Field of Classification Search
CPC .......... B08B 1/02; B08B 3/022; B08B 3/041; B08B 3/045; B08B 3/047; A23B 7/0205;
(Continued)

(56) References Cited

U.S. PATENT DOCUMENTS

| 4,989,346 A | * | 2/1991 | Wilken ................. A23N 12/08 34/95 |
| 5,143,720 A | | 9/1992 | Lopes |

(Continued)

FOREIGN PATENT DOCUMENTS

| CN | 1193897 | 9/1998 |
| EP | 2452565 | 5/2000 |

(Continued)

OTHER PUBLICATIONS

Australian Patentability Report—Sep. 26, 2019.
(Continued)

*Primary Examiner* — David G Cormier
(74) *Attorney, Agent, or Firm* — Kevin Schraven; Heber Martin Carbajal; Hankin Patent Law, APC

(57) ABSTRACT

A method and device for processing berries. The method may comprise: providing a berry preparation device that is configured to prepare a plurality of berries; placing the plurality of berries in a plurality of trays; loading the plurality of trays into the berry preparation device; wherein the berry preparation device may be positioned substantially within two rooms, a first room and a second room; wherein the berry preparation device may comprise a first wash portion, a second wash portion, a third wash portion, a first drying portion, and a second drying portion; wherein the first wash portion, the second wash portion, the third wash portion, and the first drying portion may be within the first room; wherein the second drying portion may be within the second room; and wherein the plurality of berries may be prepared by the berry preparation device are ready-to-eat and have a shelf life of at least 21 days.

5 Claims, 8 Drawing Sheets

Related U.S. Application Data continuation-in-part of application No. 13/611,765, filed on Sep. 12, 2012, now Pat. No. 9,095,152.

(51) Int. Cl.
*A23B 7/157* (2006.01)
*A23B 7/158* (2006.01)
*A23L 3/3463* (2006.01)
*A23L 3/358* (2006.01)
*A23N 12/02* (2006.01)
*A23N 12/06* (2006.01)
*B08B 3/04* (2006.01)

(52) U.S. Cl.
CPC ............. *A23L 3/3463* (2013.01); *A23L 3/358* (2013.01); *A23N 12/02* (2013.01); *A23N 12/023* (2013.01); *A23N 12/06* (2013.01); *B08B 3/041* (2013.01)

(58) Field of Classification Search
CPC ........ A23B 7/153; A23B 7/158; A23N 12/02; A23N 12/023; A23N 12/06
See application file for complete search history.

(56) References Cited

U.S. PATENT DOCUMENTS

| | | | |
|---|---|---|---|
| 5,849,678 A | 12/1998 | Prentiss | |
| 5,863,584 A * | 1/1999 | Thomas, Jr. | A23L 3/3589 99/534 |
| 5,924,217 A | 7/1999 | Peeters | |
| 6,004,660 A | 12/1999 | Topolski | |
| 2002/0170575 A1* | 11/2002 | Garcia, Jr. | A23N 12/02 134/131 |
| 2002/0192340 A1 | 12/2002 | Swart | |
| 2003/0047087 A1* | 3/2003 | Phebus | A23B 4/12 99/516 |
| 2005/0249632 A1* | 11/2005 | Garrett | A22C 18/00 422/32 |
| 2009/0151749 A1 | 6/2009 | Lewis | |
| 2012/0021105 A1 | 1/2012 | Jacobs | |
| 2014/0072683 A1* | 3/2014 | Munger | A23L 3/358 426/392 |

FOREIGN PATENT DOCUMENTS

| | | |
|---|---|---|
| EP | 1010368 A1 | 6/2000 |
| GB | 2224425 | 4/1988 |
| JP | 2002505969 | 2/2002 |
| JP | 2010018332 | 1/2010 |
| KR | 100905498 | 7/2009 |
| WO | WO 2009/042998 | 4/2009 |

OTHER PUBLICATIONS

Espacenet—Bibliographic data: CN1193897 (A)—Sep. 23, 1998.
Korean Office Action and Translation for 2015-531944—dated Feb. 16, 2018.
Chile Office Action—dated Jul. 20, 2015.
AU Examination Report on Application No. 2013316001—dated Jul. 5, 2017.
Supplementary EU Search Report, dated Mar. 16, 2014.
CN Office Action—CN 20130053030.2; dated Nov. 25, 2015.
Office Action and Translation 2015-531944—dated Apr. 18, 2017.
Office Action 2 0 1 5 - 5 3 1 9 4 4—dated Feb. 27, 2018.
EU Office Action—13837091.1—dated Mar. 12, 2018.
Canada Office Action—2,884,891—dated Aug. 27, 2019.
Australia—Office Action—2018204847—dated Sep. 26, 2019.
Vietnam Office Action—1-2015-01029—dated Sep. 27, 2019.
Brazil Office Action—BR112015005442-0—dated Aug. 23, 2013.
Chlorination in the Production and Postharvest Handling of Fresh Fruits and Vegetables, Trevor Suslow, Extension Specialist Postharvest Pathology, Transportation & Distribution, University of California—Davis—Jan. 2020.
Chlorination in the Production and Postharvest Handling of Fresh Fruits and Vegetables, Trevor Suslow, Extension Specialist Postharvest Pathology, Transportation & Distribution, University of California—Davis.

* cited by examiner

METHOD AND DEVICE FOR PROCESSING BERRIES

CROSS REFERENCE TO RELATED APPLICATIONS

This Application is a Divisional of U.S. Non-Provisional application Ser. No. 14/788,085 filed on Jun. 30, 2015, titled "A Method and Device for Processing Berries", by inventor Kewel Munger. U.S. Non-Provisional application Ser. No. 14/788,085 is a Continuation-in-Part of U.S. Non-Provisional application Ser. No. 13/611,765 filed on Sep. 12, 2012, titled "Method for Disinfecting, Sanitizing, and Packaging Ready-to-Eat Produce," by inventor Kewel Munger, now U.S. Pat. No. 9,095,152, the contents of both of which are expressly incorporated herein by this reference and to which priority is claimed.

FIELD OF USE

This present disclosure generally relates to methods and devices for processing berries. More specifically, the present disclosure relates to methods and devices that sanitize, wash, rinse, dry, and package the berries, such that the berries are ready-to-eat without further washing by the consumer and with minimal physical harm or bruising to the berry.

BACKGROUND

Berries such as blueberries, strawberries, raspberries, and blackberries are generally considered to be one of the healthiest foods available and have been called a "super food" for many reasons. Berries are generally high in anti-oxidants, Vitamin C, dietary fiber, and magnesium. Berries also promote eye and heart health, support brain function, and aid in proper digestion. Berries have even been touted as being able to help stave off cancer.

The primary problem with berries, however, is trying to make them more accessible to the consuming public. One reason that this is a problem is that berries are regional and generally have a short shelf life. As a result, it has not been feasible or economical to make berries available all year round. Unfortunately, seasonal berries often fail to become a part of everyday nutrition, even if it is the best option, as berries most certainly are.

Due to the globalization of shipping produce, it is now possible to make produce available year round. Produce in the southern hemisphere, such as those grown in South America, are usually in season when the North American produce is not. However, it typically takes approximately two to three weeks to ship produce from South America to North America. Accordingly, berries that have a shelf life less than one week cannot reasonably be shipped between North and South America.

In general, the shelf life of fresh berries is typically very short. For example, according to http://shelflifeadvice.com/fruit/fresh-fruit/berries-strawberries-blueberries-raspberries, the refrigerated shelf life of raspberries is 2 days, strawberries is 3 days, and blueberries is 1 one week. Gregerson, John. "Berries—Strawberries, Blueberries, Raspberries." *Shelf Life Advice,* 2 Jun. 2009. Web. 18 Aug. 2014. Moreover, washing berries accelerates their degradation because excessive exposure to moisture speeds decay of the berries. Thus, fresh berries are typically not washed before they are shipped. Accordingly, the consumer must ensure that fresh berries bought at the market are washed at home before consumption.

Before utilizing the present device and method, berries were not available the entire year and were not washed before they were shipped. Indeed, any berry washing that occurred at a berry processing facility was to freeze the berries for further processing.

Thus, there is a long felt need in the art for a device and method for processing berries that do not cause mechanical harm to the berries while providing washed, packaged, Ready-To-Eat, fresh looking, and safe-to-eat berries, as in the case of blueberries, which have a shelf life of at least 21 days.

SUMMARY

To minimize the limitations in the cited references, and to minimize other limitations that will become apparent upon reading and understanding the present specification, the present devices and methods disclose a three-step berry washing, sanitizing, and disinfecting method, achieved by a berry preparation device, followed by a drying and packaging, wherein the berries are disinfected, sanitized, thoroughly dried, and packaged. This is preferably achieved with minimal to no mechanical damage to the berry, which prevents premature degradation of the berries and/or rejection of the final product by the consumer. The method may involve the berries being chilled and sorted upon arrival at the processing facility, going through specific washes for specific, yet variable, periods of time, and, finally, being dried and packaged.

The present disclosure is a method for disinfecting, sanitizing, drying and packaging berries. The preferred embodiment comprises the following steps: first wash, second wash, third and final rinse, drying, and packaging. Importantly this method may be achieved with little bruising or scarring to the berries.

Before the berries are put into the berry processing device and method, the berries may be received at the processing facility and immediately cooled. The berries may be sorted by color, softness, texture, and overall quality, and all extraneous materials are removed. There may be two preferable temperature ranges at which the entire process should occur. There is the "cool" temperature range, which may be approximately 50-55 degrees Fahrenheit (10-13 degrees Celsius). There is also the "colder" or "cooler" range, which may be approximately 34 to 40 degrees Fahrenheit (approximately between 1-5 degrees Celsius). During the initial sorting, the berries are preferably 10-13 C. To maintain freshness of the berries, it is important that the temperatures in the processing facility do not deviate below freezing (0.0 degrees Celsius) or above 13 degrees Celsius for any substantial period of time. Once the berries are sorted, they are preferably placed in stackable trays carefully and generally moved into a colder staging room (approximately between 1-5 C). This staging room may include additional sorting machines and room to further sort berries. Once the temperature of the berries is lowered to approximately 1-5 C, the trays holding the berries may be loaded into the machine(s) that perform the berry washing method. This is preferably done by loading the trays onto a conveyor belt and carrying the berry laden trays up to a hole in the wall of the staging room. On the other side of the hole, in the primary washing room, is preferably the beginning of the berry washing device.

To have the greatest efficacy and quality of sanitizing, the present method preferably includes an automatic three-step sanitizing and disinfecting wash process.

The berries are preferably dried in a two-step process that is done in two distinct rooms using an air blade and vacuum system. Importantly, none of the dryers preferably increase the temperature of the berries, which prevents or greatly limits damage to the internal flesh of the fruit or vegetable being dried. Subsequently, the berries will be packaged in containers and be sold as Ready-to-Eat.

Each wash may be applied using a washing process with rain action, waterfall action, spray jets or sprayers (continuous, one-time, or intermittent), submersion, and/or partial submersion. Each wash is, preferentially, a sanitizing agent selected from classes of substances generally regarded as safe ("GRAS") or which have been ascribed secondary food additive status as those terms defined by the United States Food and Drug Administration in 21 C.F.R. §§ 178, 182, and 184. The selected washes should, and preferably do, have properties similar to chlorine dioxide or an anionic surfactant and organic acid sanitizer composition, such as PRO-SAN®, an anionic surfactant and organic acid sanitizer composition.

In one embodiment, the berries are preferably dried using air curtains or air knives, in combination with vacuum dryers, such that the berries are dried without bruising, scratching, raising the temperature of the berry, or otherwise harming the berries and without contaminating the berries with pathogens. Controlling the humidity during the drying process by splitting the drying process into two separate rooms is preferred to encourage faster evaporative drying.

Subsequently, the berries may be packaged in a protective tray, box, bowl, cup, gel package, bag, clamshell, or any other type of packaging known in the art to provide physical protection to the berries to limit or prevent damage while shipping. In a preferred embodiment, the packaging is preferably sealed with Oxygen Transmission Rate ("OTR") film, such as micro-perforated film, or similar covering that will keep the berries contained within the packaging means. OTR film is generally used to achieve the target concentration of oxygen and moisture transmission inside of the package to promote shelf-life and shelf-appearance. The preferred in-package concentrations of oxygen and carbon dioxide are approximately 4% and 14% respectively.

In a preferred embodiment, after packaging, the berries are shipped and sold at or below 40 degrees Fahrenheit (4.4 degrees Celsius), but above freezing. This temperature generally maintains a fresh appearance, inhibits microbial growth, and helps maximize the shelf-life of the berries.

In one embodiment, the berries may pass through the process via one or more conveyor belts or other similar moving platform that will efficiently move the berries and the trays that they are sometimes in through the washing, drying and packaging phases.

It is an object of the present device and method to overcome limitations in the prior art.

It is another object of the device and method to dramatically increase the shelf-life of berries, improve the appearance of berries on the market shelf, protect consumers from foodborne pathogens, improve the viability of exporting and importing berries, and provide an environmentally friendly method of sanitizing and disinfecting fresh picked berries.

The present device and method preferably improves the shelf life and chemical stability of fresh, packaged berries, such as blueberries, by sanitizing and packaging the blueberries safely and efficiently. In some instances, the shelf life of these fresh blueberries has lasted at least 40 days based on microbial, physical, and sensory analysis. Under similar testing conditions, when input berries were of a lower initial quality, that is, soft with lots of scarring, the shelf life of these blueberries has been at least 21 days, which is at least three times longer than if they had been cleaned with Chlorine Dioxide alone.

One embodiment of the device and method is a berry washing method comprising the following steps: providing a berry preparation device that is configured to prepare a plurality of berries; wherein the plurality of berries are placed in a plurality of trays; loading the plurality of trays into the berry preparation device; wherein the berry preparation device is contained within two rooms, a first room and a second room; wherein the berry preparation device comprises a first wash portion, a second wash portion, a third wash portion, a first drying portion, and a second drying portion; wherein the first wash portion, the second wash portion, the third wash portion, and the first drying portion are within the first room; wherein the second drying portion is within the second room; and wherein the plurality of berries prepared by the berry preparation device are ready-to-eat and have a shelf life of at least 21 days.

The berry washing method may further comprise the steps: washing the plurality of berries in an oxidizer sanitizer wash by the first wash portion; washing the plurality of berries in a surfactant sanitizer wash by the second wash portion; and washing the plurality of berries in a final rinse sanitizer by the third wash portion. Preferably, the first wash portion comprises a rain drip wash device. Preferably, the second wash portion comprises a plurality of sprayers and the third wash portion comprises a waterfall and/or spray nozzle(s) wash device. Preferably, the berry preparation device automatically moves the plurality of trays through the first wash portion, such that the plurality of berries are washed by the first wash portion within the plurality of trays. Preferably the berry preparation device automatically moves the plurality of trays through the second wash portion, such that the plurality of berries are washed by the second wash portion within the plurality of trays. Preferably, the berry preparation device automatically moves the plurality of berries through the third wash portion, such that the plurality of berries pass under the waterfall and/or spray nozzle(s) wash device. Preferably, the berry preparation device automatically decelerate and/or tips over the plurality of trays after the plurality of trays exit the second wash station, such that the plurality of berries are gently removed from the plurality of trays, and such that a plurality of empty trays are generated. Preferably, the oxidizer sanitizer wash is circulated out of the first wash portion, to a first chiller, and then recirculated back into the first wash portion, such that a temperature of the oxidizer sanitizer wash is kept between 1-5° C. Preferably, the surfactant sanitizer wash is circulated out of the second wash portion, to a second chiller, and then recirculated back into the second wash portion, such that a temperature of the surfactant sanitizer wash is kept between 1-5° C. Preferably, the second room has a relatively low humidity, wherein the first room has a relatively high humidity. Preferably, the temperature of the first and second room is 1-5° C. Preferably, the first and second rooms are maintained as substantially clean rooms. Clean air is introduced into the second room through hepa filters. This creates a positive pressure, such that air flows outward from the second room, which in turn substantially prevents airborne pathogens from entering the second room. Dry, cool air preferably flows from the second room to the first room, such that the humidity in the first room is substantially prevented from entering the second room. The air flowing from the second room to the first room also causes the first room to have a positive pressure, with respect to all entrances and exits that do not lead to the second room, such that airborne pathogens are substantially prevented from entering the first room.

Preferably, the berry preparation device automatically moves the plurality of trays from the first wash portion to the second wash portion. Preferably the steps further comprises transporting the plurality of berries automatically to the third wash portion; and wherein the berry preparation device automatically moves the plurality of berries from the third wash portion to the first drying portion. The berry washing method may further comprise the steps: removing the plurality of empty trays from the berry preparation device. Preferably, the first drying portion comprises one or more powerful vacuums and one or more air knife dryers. Preferably, the one or more air knife dryers are positioned above the plurality of berries; wherein each of the one or more vacuums comprises a suction motor and a tube; wherein the tube has a suction motor end and a dryer end; and wherein the dryer end is positioned below the plurality of berries. Preferably, the one or more of the dryer ends of the tubes of the one or more powerful vacuums are aligned with the one or more air knife dryers, such that each of the one or more dryer ends is directly below one of the one or more air knife dryers. Preferably, the one or more powerful vacuums (a) removes a surface moisture from said plurality of berries, and (b) firmly but gently holds the plurality of berries against the berry preparation device, such that the plurality of berries are substantially prevented from being blown out of the berry preparation device by the one or more air knife dryers. Preferably, the berry preparation device moves the plurality of berries through the first drying portion and then through a hole in a wall separating the first room and the second room, and then through the second drying portion. Preferably, the second drying portion comprises one or more powerful vacuums and one or more air knife dryers; wherein the one or more powerful vacuums and the one or more air knife dryers of the second drying portion have substantially the same configuration as those in the first drying portion; and wherein placement of the second drying portion allows the plurality of berries to dry more completely due to the lower relative humidity of the second room. Preferably, the device unloads or removes the plurality of berries. Preferably the berries are packaged. In one embodiment the plurality of berries are blueberries, wherein the berry preparation device removes a bloom on the plurality of blueberries, such that the blueberries have an attractive appearance.

Another embodiment is a berry preparation device comprising: a berry preparation device; and a plurality of trays that are configured to hold a plurality of berries; wherein the berry preparation device is contained within two rooms, a first room and a second room; wherein the plurality of trays are loaded into the berry preparation device; wherein the berry preparation device comprises a first wash portion, a second wash portion, a third wash portion, a first drying portion, and a second drying portion; wherein the first wash portion, the second wash portion, the third wash portion, and the first drying portion are within the first room; and wherein the second drying portion is within the second room. Preferably, the first room is maintained as a substantially clean room and with positive pressure; wherein a temperature of the first room is 1-5° C.; wherein the second room is maintained as a substantially clean room and has a relatively low humidity, wherein the first room has a relatively high humidity; and wherein a temperature of the second room is 1-5° C. Preferably, the first wash portion is configured to wash the plurality of berries in an oxidizer sanitizer wash; wherein the second wash portion is configured to wash the plurality of berries in a surfactant sanitizer wash; wherein the third wash portion is configured to wash the plurality of berries in a final rinse sanitizer; wherein the first wash portion comprises a rain drip wash and wherein the berry preparation device automatically moves the plurality of trays through the first wash portion, such that the plurality of berries are washed by the first wash portion within the plurality of trays; wherein oxidizer sanitizer wash is circulated out of the first wash portion, to a first chiller, and then recirculated back into the first wash portion, such that a temperature of the oxidizer sanitizer wash is kept between 1-5° C.; wherein the berry preparation device automatically moves the plurality of trays from the first wash portion to the second wash portion; wherein the second wash portion comprises a plurality of sprayers and wherein the berry preparation device automatically moves the plurality of trays through the second wash portion, such that the plurality of berries are washed by the second wash portion within the plurality of trays; wherein surfactant sanitizer wash is circulated out of the second wash portion, to a second chiller, and then recirculated back into the second wash portion, such that a temperature of the surfactant sanitizer wash is kept between 1-5° C.; wherein the berry preparation device automatically decelerate and/or tips over the plurality of trays after the plurality of trays exit the second wash station, such that the plurality of berries are gently removed from the plurality of trays, and such that a plurality of empty trays are generated; wherein the berry preparation device further comprises a tray removal device that automatically removes the plurality of empty trays; wherein the berry preparation device is configured to transport the plurality of berries to the third wash portion; wherein the third wash portion comprises a waterfall wash and/or spray nozzle(s) device and wherein the berry preparation device is configured to automatically move the plurality of berries through the third wash portion, such that the plurality of berries pass under the waterfall and/or spray nozzle(s) wash device; and wherein the berry preparation device is configured to automatically move the plurality of berries from the third wash portion to the first drying portion. Preferably, the first drying portion comprises one or more powerful vacuums and one or more air knife dryers; wherein the one or more powerful vacuums are below the plurality of berries and wherein the one or more air knife dryers are above the plurality of berries; wherein the one or more powerful vacuums are aligned with the one or more air knife dryers, such that each of the one or more powerful vacuums is directly below one of the one or more air knife dryers; wherein the one or more powerful vacuums (a) removes a surface moisture from said plurality of berries, and (b) firmly but gently holds the plurality of berries against the berry preparation device, such that the plurality of berries are substantially prevented from being blown out of the berry preparation device by the one or more air knife dryers; wherein the berry preparation device is configured to move the plurality of berries through the first drying portion and then through a hole in a wall separating the first room and the second room, and then through the second drying portion; wherein the second drying portion comprises one or more powerful vacuums and one or more air knife dryers; wherein the one or more powerful vacuums and the one or more air knife dryers of the second drying portion have substantially the same configuration as those in the first drying portion; wherein placement of the second drying portion allows the plurality of berries to dry more completely due to the lower relative humidity of the second room. Preferably, the washed and dried berries are removed and packaged and are ready-to-eat and have a shelf life of at least 21 days. The berries may be blueberries, wherein the berry preparation device removes a bloom on the plurality of blueberries, such that the blueberries have an attractive appearance.

These and other features, aspects, and advantages of the present device and method will become better understood with regard to the following description, appended claims, and accompanying drawings.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Figure 1:
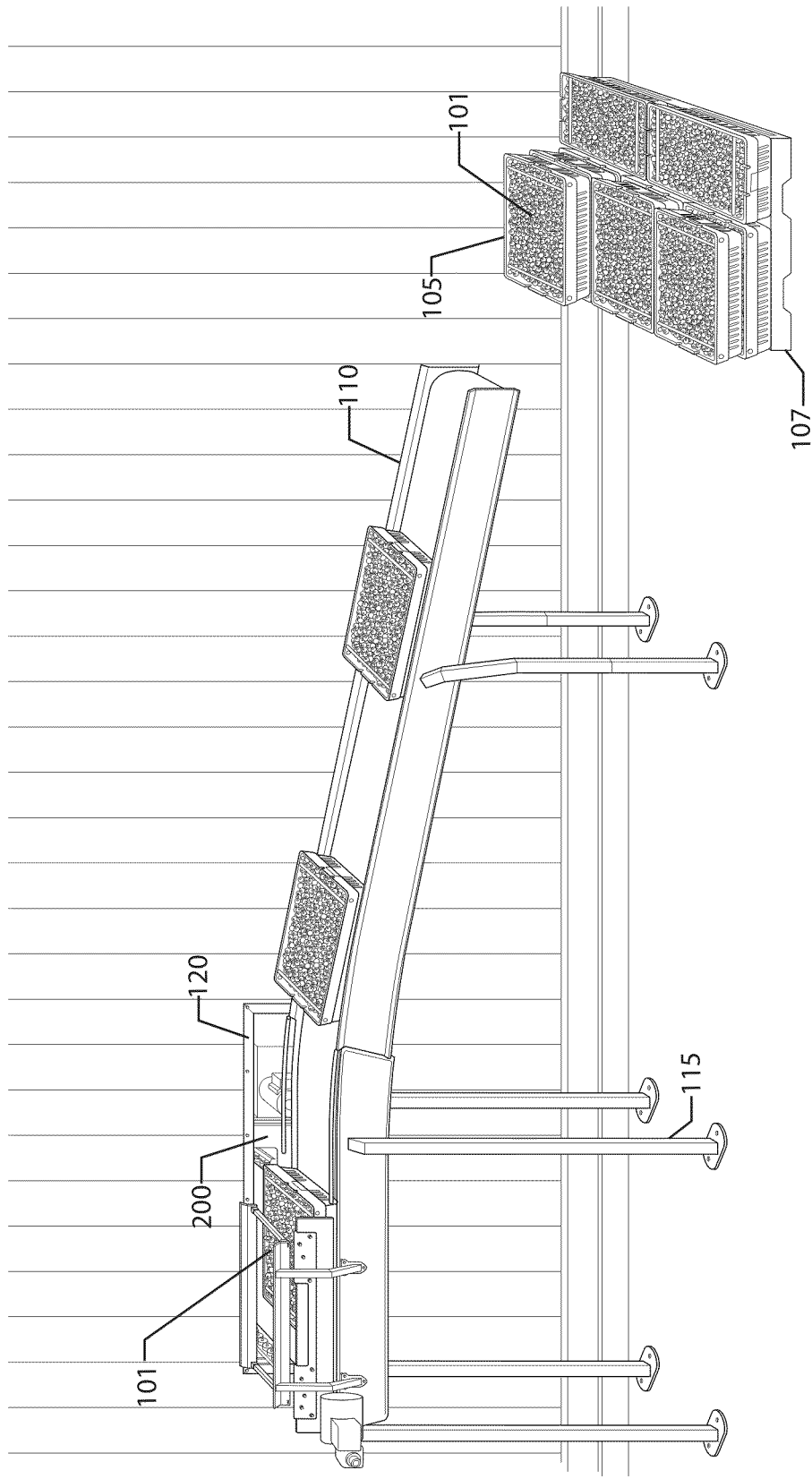
FIG. 1 is an illustration of one embodiment of the staging room.

In the following detailed description of various embodiments, numerous specific details are set forth in order to provide a thorough understanding of various aspects of one or more embodiments of the device and method. However, one or more embodiments may be practiced without some or all of these specific details. In other instances, well-known methods, procedures, and/or components have not been described in detail so as not to unnecessarily obscure aspects of the embodiments.

While multiple embodiments are disclosed, still other embodiments will become apparent to those skilled in the art from the following detailed description, which shows and describes illustrative embodiments. As will be realized, the embodiments are capable of modifications in various obvious aspects, all without departing from the spirit and scope. Accordingly, the screen shot figures, and the detailed descriptions thereof, are to be regarded as illustrative in nature and not restrictive. Also, the reference or non-reference to a particular embodiment shall not be interpreted to limit the scope.

In the following description, certain terminology is used to describe certain features of one or more embodiments. For instance, the term "wash" generally refers to applying water or some other liquid, often a cleaner, sanitizer, or disinfectant, to a product. Wash or washing can occur through a rain, shower, or sprinkler spray, rain drip, spraying, spray nozzles, soaking, dipping, rubbing, bathing, or scrubbing the product in the liquid. The period of contact time for a wash varies, and the preferred timings are provided when relevant.

As used herein, the term "berries" generally refers to various fruits, including, but not limited to: blueberries; blackberries; raspberries; logan berries; strawberries; elderberries; ligonberries; boysenberries, mulberries; olallieberries; marrionberries; or other similar berries that can benefit from being disinfected and sanitized before it is sold to a consumer. The berries that would go through this process and machine may be classified in the Ready-to-Eat ("RTE") category of berries.

As used herein, the term "extraneous materials" generally refers to dirt, rocks, leaves, stems, pesticides, chemicals or other similar materials such that its nature is apparent in farming berries, but its presence in a RTE product is undesirable and deleterious.

As used herein, the term "mechanical harm" generally refers to bruising, scarring, discoloration, or any other physical damage caused to berries as a result of the bumping or moving related to the sanitizing, washing, drying, packaging, or shipping processes.

As used herein, the term "tray" generally refers to a container. The trays or containers are preferably stackable, generally rectangular, four sided, and open on top. The trays are preferably porous or grated, such that the berries are not allowed to slip through the holes, but liquid is allowed to pass.

The washing steps and wash portions may be, by their very nature, wet. As such, the humidity of the first room is relatively high, despite the 1-5° C. temperature of the first room. The second room is kept at a low humidity to aid in evaporative drying.

FIG. 1 is an illustration of one embodiment of the staging room. As shown in FIG. 1, one embodiment of the staging room 100 preferably contains fresh picked berries 101 that have been sorted and loaded into trays 105. The staging room is preferably at 1-5° C. The trays 105 may be loaded onto conveyor 110, which transports the trays up to a hole in the wall 120 where they may be loaded into berry preparation device 200. The conveyor 110 may be supported on legs 115 and the stacked trays 105 may be elevated on pallets 107.

Figure 2:
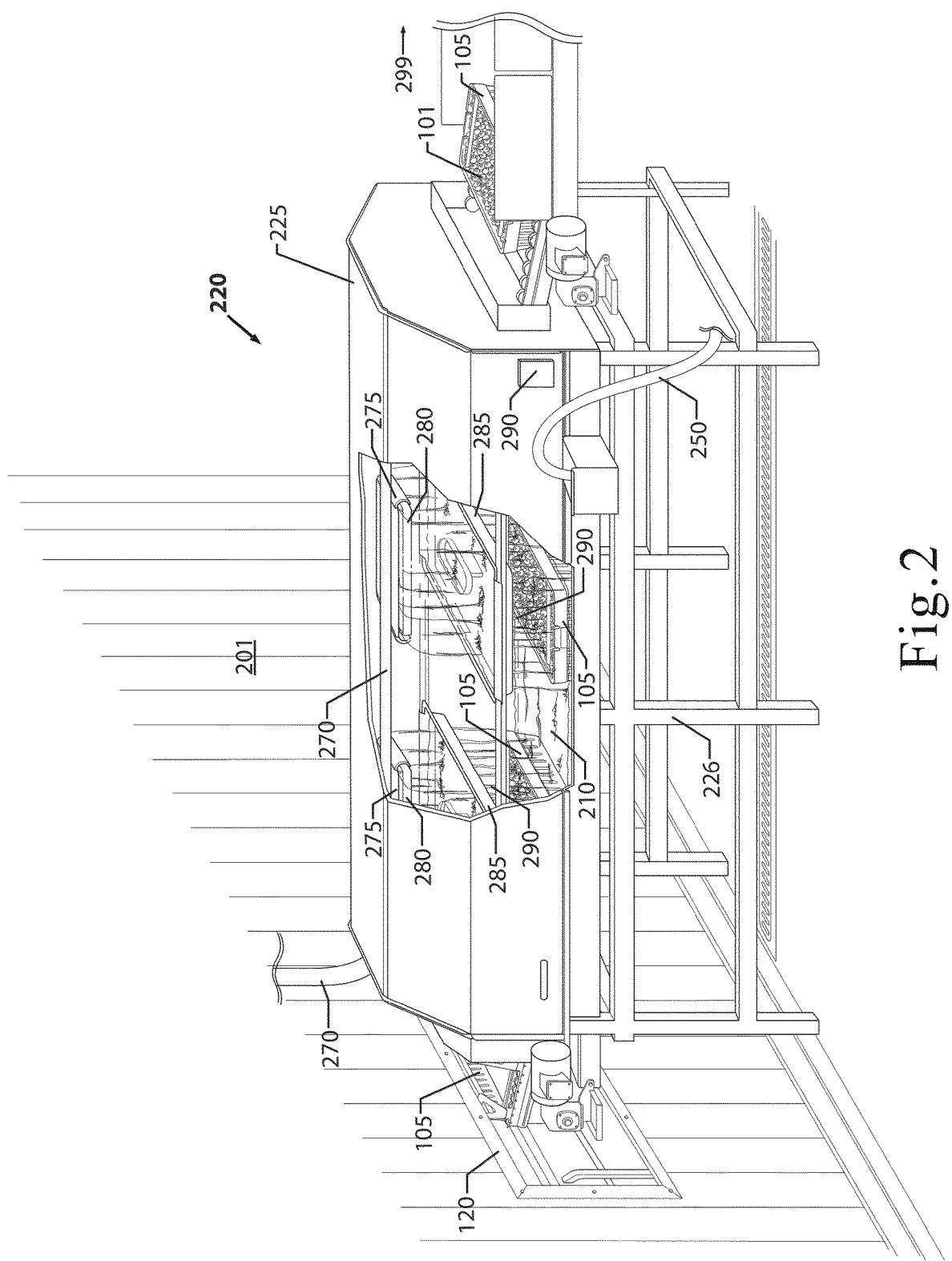
FIG. 2 is an illustration of one embodiment of the berry preparation device and shows the first wash portion.

FIG. 2 is an illustration of one embodiment of the berry preparation device and shows the first wash portion. FIG. 2 shows the first wash portion 220 of the berry preparation device 200 within the first room 201. The first wash portion may comprise: rain wash device 275, solution spout 280, rain sieve 285, first wash cleaning solution 290, incoming pipe 270, cover 225, conveyor 210, recirculation pipes 250, legs 226, and controller and monitor 290. The berry loaded trays 105 preferably come in through the hole 120 and they may be carried through the first wash portion 220.

In one embodiment, the first wash portion cleaning solution 290 may be an oxidizer sanitizer. In the preferred embodiment, chlorine dioxide may be used for the first wash. This wash preferably has approximately 1.2 to 2.5 minutes of contact time with the berries. The preferred concentration of Chlorine Dioxide is approximately 0.8 to 3.0 parts per million (PPM). The substrate for the Chlorine Dioxide may be filtered water. The recirculation pipes preferably take the first wash cleaning solution 290 to a chiller and filter that keep the first wash cleaning solution 290 clean and at approximately 1-5° C. The solution spout 280 may pour first wash cleaning solution 290 over the rain sieve 285, which preferably drips the first wash cleaning solution 290 over the trays 105, which gently sanitizes and washes berries 101. Because the berries 101 may be kept in the trays 105, and submerged in the cleaning solution, mechanical damage preferably does not occur to the berries 101. The controller and monitor 290 may be two separate devices and may be attached or apart from the cover 225. The controller may allow the user to control the device 200 and/or first wash portion 220. The monitor may allow the solution concentration levels to be monitored and corrected (manually and/or automatically).

Hole 120 is preferably as small as possible to keep the first room 201 as clean as possible and to minimize humid air moving from the first room to the second room.

Preferably, the first and second rooms are maintained as substantially clean rooms. Clean air is introduced into the second room through hepa filters. This creates a positive pressure, such that air flows outward from the second room, which in turn substantially prevents airborne pathogens from entering the second room. Dry, cool air preferably flows from the second room to the first room, such that the humidity in the first room is substantially prevented from entering the second room. The air flowing from the second room to the first room also causes the first room to have a positive pressure, with respect to all entrances and exits that do not lead to the second room, such that airborne pathogens are substantially prevented from entering the first room. First room 201 is preferably kept substantially as a clean room and with positive pressure—with respect to all doors not leading to the second room—to prevent unwanted pathogens from entering the first room 201. Positive pressure generally means that the room has a positive air pressure, such that air flows outwards from the room.

After the trays 105 exit the first wash portion 220, the trays 105 may be moved 299 to second wash portion 300.

Figure 3:
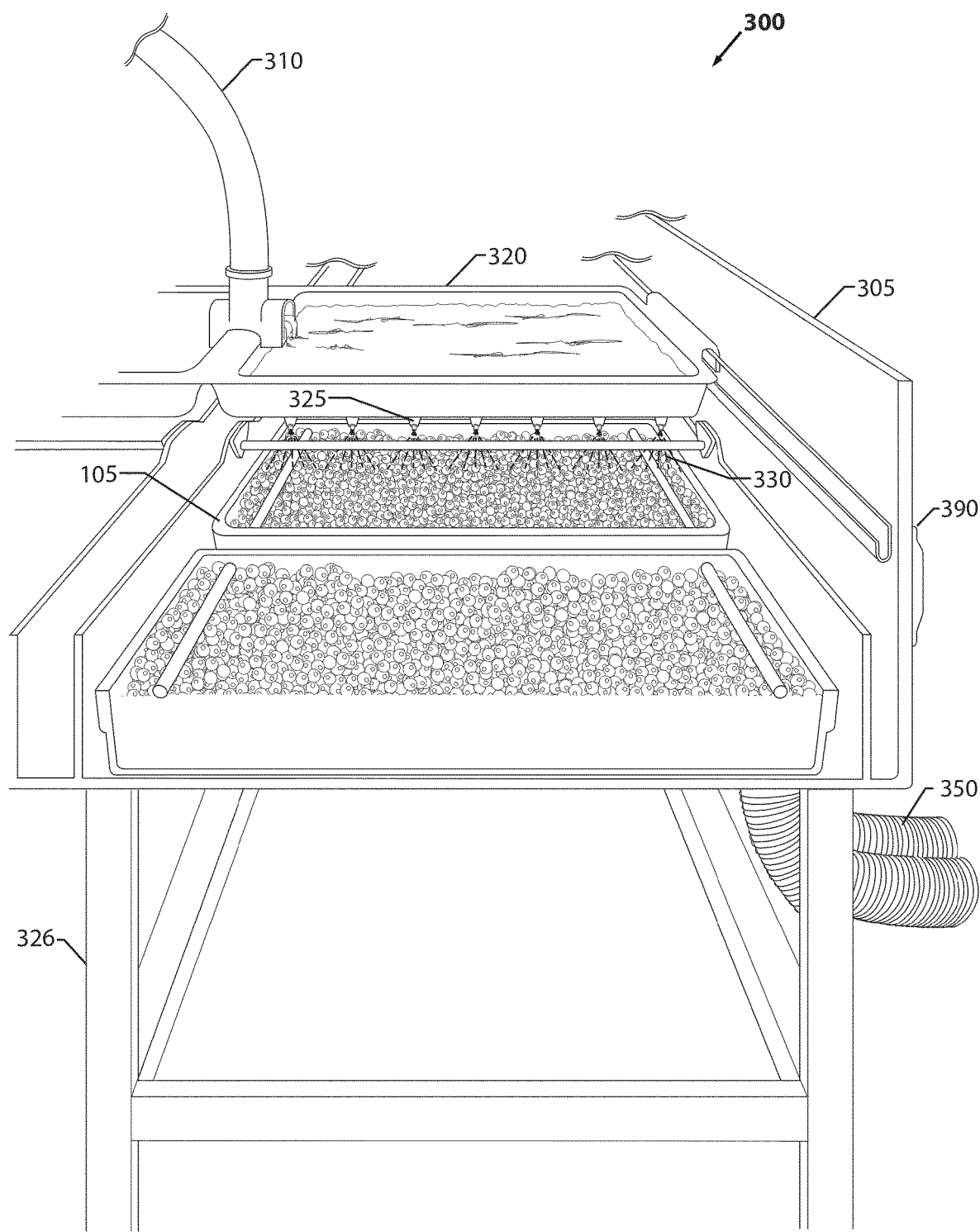
FIG. 3 is an illustration of one embodiment of the berry preparation device and shows the second wash portion.

FIG. 3 is an illustration of one embodiment of the berry preparation device and shows the second wash portion. The trays 105 may be passed through the second wash portion 300, preferably automatically. The second wash portion 300 may comprise: a structure 305, sprayers 325, sprayer support 320, second wash cleaning solution source pipe 310, recirculation pipes 350, monitor and controller 390, and legs 326. The sprayers or sprayer jets 325 preferably gently spray a surfactant solution 330 onto the berries 101.

As shown in FIG. 3, the berries 101 may be moved through second wash portion 300 within the trays 105, which preferably prevents any mechanical damage from occurring during this wash step. The preferred sanitizing agent used in the second wash portion may be a surfactant sanitizer 330. In the preferred embodiment, the anionic surfactant and organic acid sanitizer composition PRO-SAN®, an anionic surfactant and organic acid sanitizer composition, at 0.78% (1 oz./gal) is used to wash the berries. Concentration is monitored by measuring of the pH of the PRO-SAN®, an anionic surfactant and organic acid sanitizer composition, solution and preferably remain between approximately 2.4 and 2.8. The monitoring may be done automatically by the controller and monitor 390. The controller and monitor 290 may also automatically correct any concentration imbalances. The pH may also be monitored and controlled manually.

The contact time of this second wash with the berries is preferably between approximately 2.0 to 3.5 minutes, in order to maximize the sanitization effect.

The recirculation pipes 350 preferably take the runoff solution 330 to a chiller and filter that keep the solution 330 clean, balanced, and at approximately 1-5° C. The controller and monitor 390 may be two separate devices and may be attached or apart from the structure 305. The controller preferably allows the user to control the device 200 and/or second wash portion 300. The monitor preferably allows the pH and solution concentration levels to be monitored and corrected (manually and/or automatically).

Second wash portion 300 may have any number of sprayers or be any length to sufficiently wash the berries 101.

Figure 4:
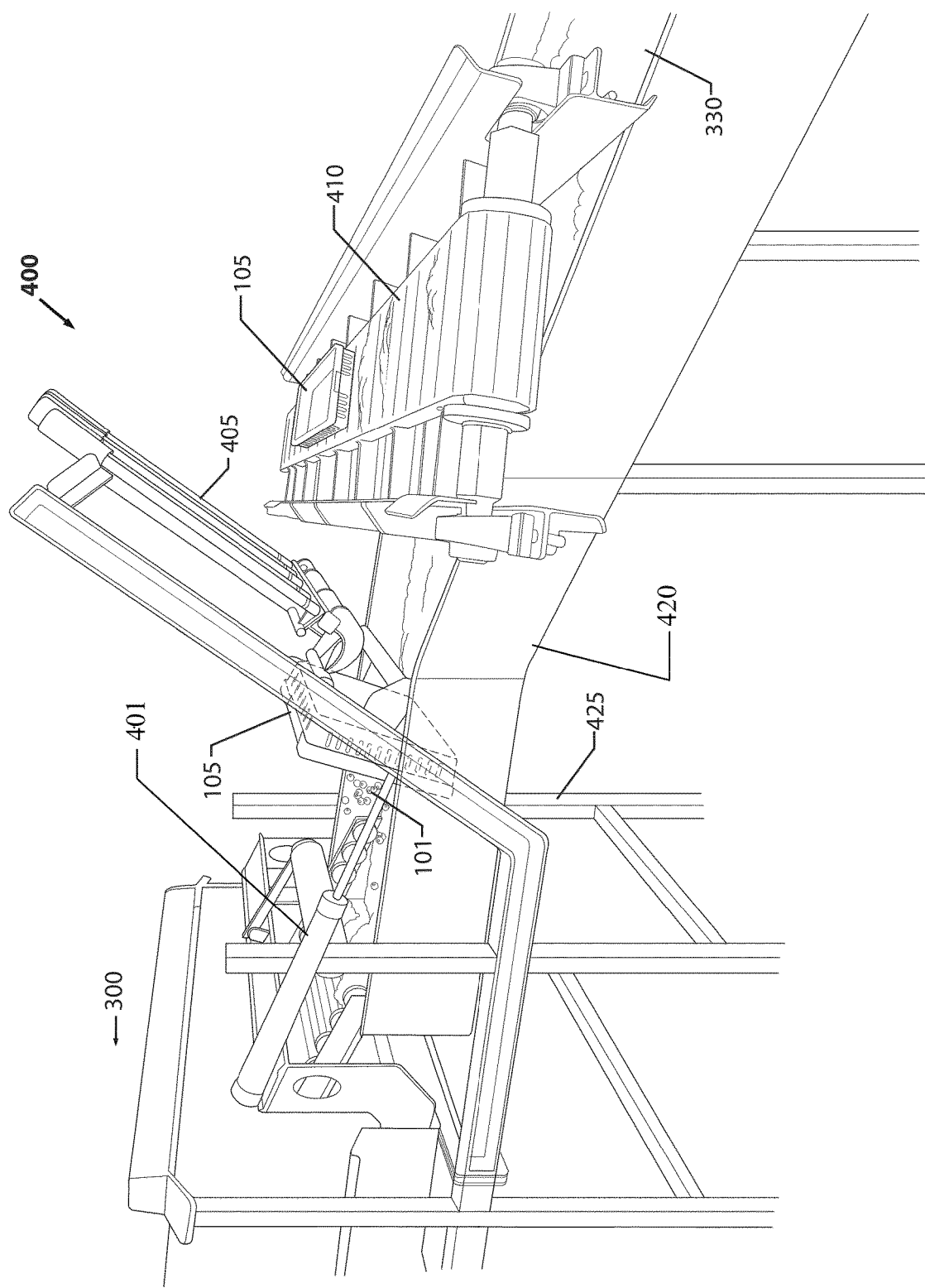
FIG. 4 is an illustration of one embodiment of the berry preparation device and shows the tray removal portion.

FIG. 4 is an illustration of one embodiment of the berry preparation device and shows the tray removal portion. As shown in FIG. 4, the tray removal portion 400 may comprise: a tray decelerator 401, tray tipper 405, conveyor 410, trough 420, and legs 425. Tray decelerator 401 may gently transition the trays to the tray tipper 405. Tray tipper 405 may be a device that automatically tips the trays 105 such that the berries 101 may be released into trough 420. The trays 105 may then be removed to conveyor 410. The berries 101 may then be carried by the surfactant solution 330 runoff towards the third wash portion 500.

Figure 5:
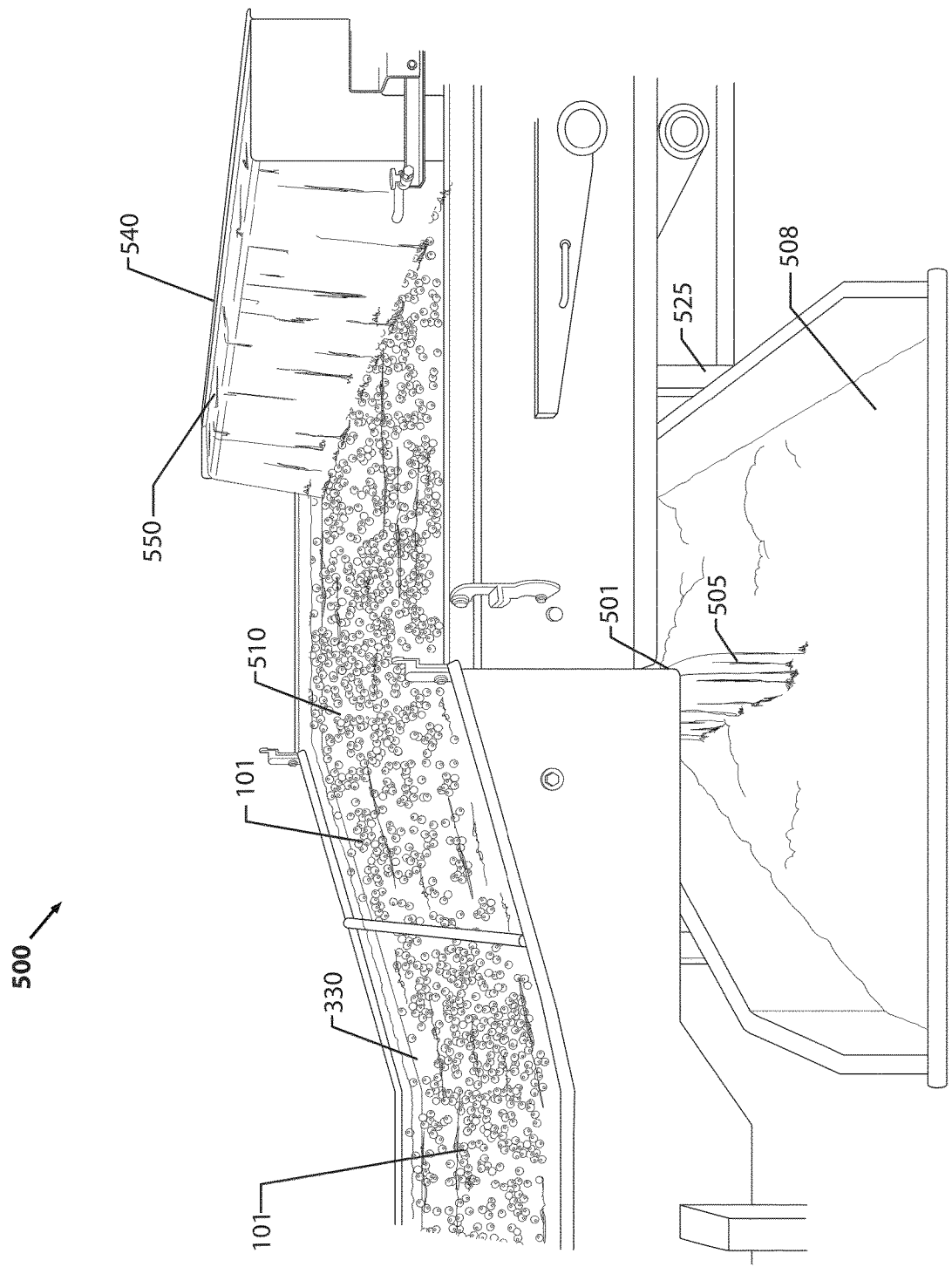
FIG. 5 is an illustration of one embodiment of the berry preparation device and shows the third wash portion.

FIG. 5 is an illustration of one embodiment of the berry preparation device and shows the third wash portion. As shown in FIG. 5, one embodiment of the third wash portion 500 may comprise: a waterfall wash device 540, which may also be a spray nozzle(s) device, structure 520, conveyor 510, legs 525, and gap 501. The gap 501 preferably allows the second wash solution 330 to drain 507 from the device 200 down towards the trough 508. The conveyor 510 preferably carries berries 101 up and out of second wash solution 330 and through third wash portion 500.

In the illustrated embodiment, berries 101 may move on a slow moving water permeable conveyor belt 510. In an alternate embodiment, the conveyor belt may be a plurality of belts working in line with transitions between each unique belt. The benefit of both of these embodiments is that they substantially prevent mechanical harm from damaging the skin, peal, or external layer of the berries 101. The conveyor belt 510 and structure 520 are preferably wide enough so that berries 101 can rest at a single layer and still be effectively processed. Next, berries 101 pass under the third wash solution 550, which generally comes out of the water wash device 540. In one embodiment, the third wash solution 550 may be a final rinse sanitizer such as PRO-SAN® Final Rinse. The preferred concentration of the final rinse sanitizer is approximately 0.2% (0.25 oz/gal). Concentration may be monitored by observing a pH between 2.4-2.8. The third wash solution 550 may be chilled at the preferred temperature of 34 to 40 degrees Fahrenheit (1-5 degrees Celsius). At this stage, berries has been thoroughly sanitized without any mechanical harm, discoloration, or other negative effects on the berries 101. The berries 101 may also be spread out in a single layer on the conveyor and are ready to be dried.

Figure 6:
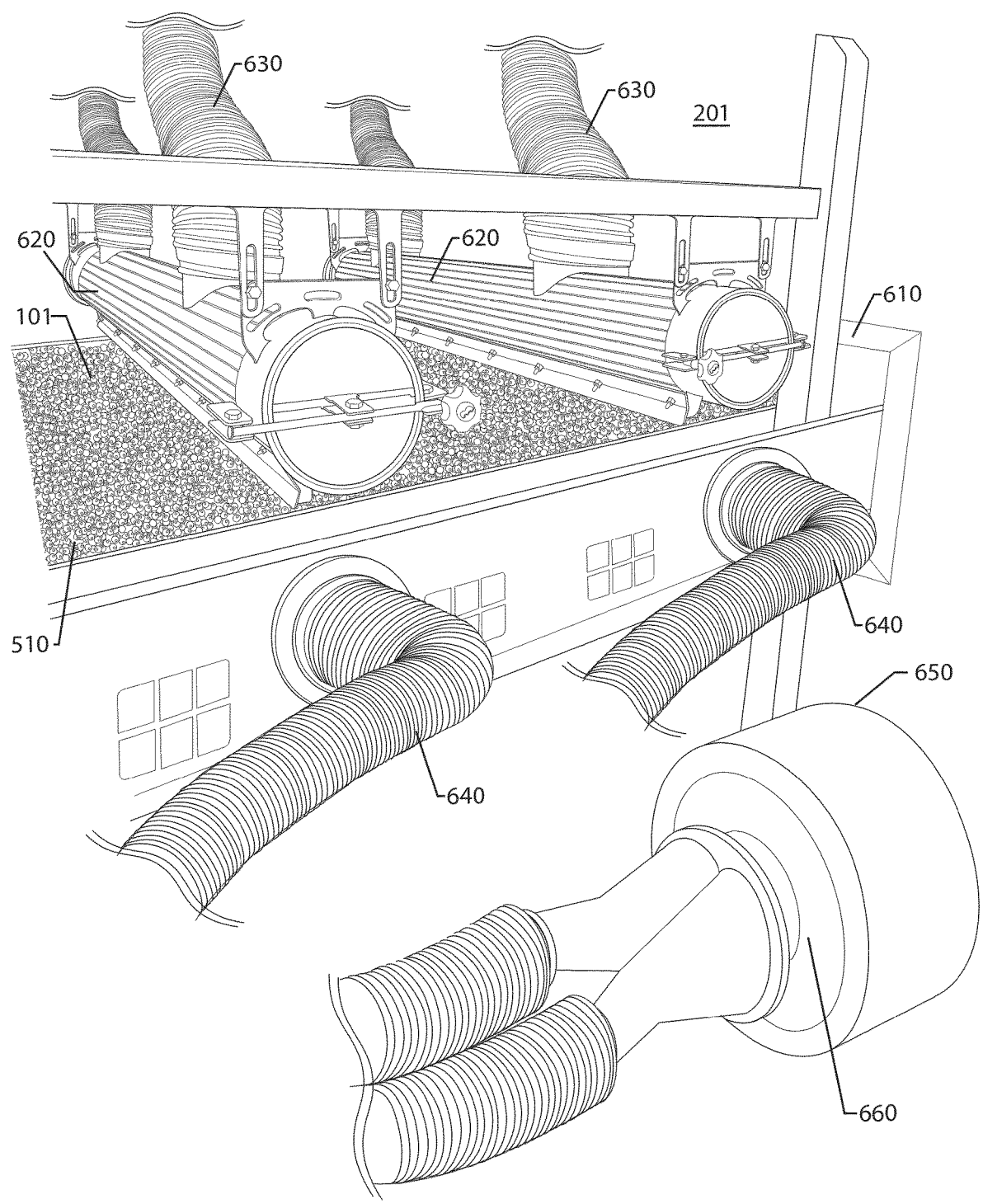
FIG. 6 is an illustration of one embodiment of the berry preparation device and shows the first drying portion.

FIG. 6 is an illustration of one embodiment of the berry preparation device and shows the first drying portion. The first drying portion may be in the first room 201 and may remove the liquid from the berries 101 as much as possible before the berries 101 are passed towards the second room. As shown in FIG. 6, one embodiment of the device 200 may comprise: a first drying portion 600. First drying portion 600 may comprise air knife dryers 620, tubes 630, conveyor 510, powerful vacuums 650, vacuum tubes 640, and motor 660. As shown, the powerful vacuums 650 may be below the conveyor 510 and berries 101 and the air knife dryers 620 may be above the conveyor 510 and berries 101. As shown, the powerful vacuums 650 may be aligned with the air knife dryers 620, such that each of the powerful vacuums 650 is directly below a reciprocal air knife dryer 620. The powerful vacuums 650 preferably (a) removes a surface moisture from said plurality of berries 101, and (b) firmly but gently hold the berries 101 against the conveyor 510 of the berry preparation device 200. As a result, the berries 101 are preferably, substantially prevented from being blown around, away, and/or out of the berry preparation device 200 by the air knife dryers 620. The conveyor 510 may move the berries 101 through the first dying portion 600 and then through a hole 610 in a wall separating the first 201 and the second room.

In the illustrated embodiment, berries 101 move on water permeable conveyor belt 510. The conveyor belt 510 may be wide enough so that a single layer of berries 101 may effectively be processed. In the illustrated embodiment, an air knife, blade, or curtain type dryer is depicted.

These driers function to remove the excess of water by blowing air over the quantity of berries and driving the excess water through the water permeable conveyor belt 510 where it is pulled away by the powerful vacuums 650. The first drying portion is preferably within the first room 201, so it operates at 1-5° C. At this stage, the berries 101 may have been thoroughly sanitized and dried without harm to the color or quality of the berries and they are mostly dry.

Figure 7:
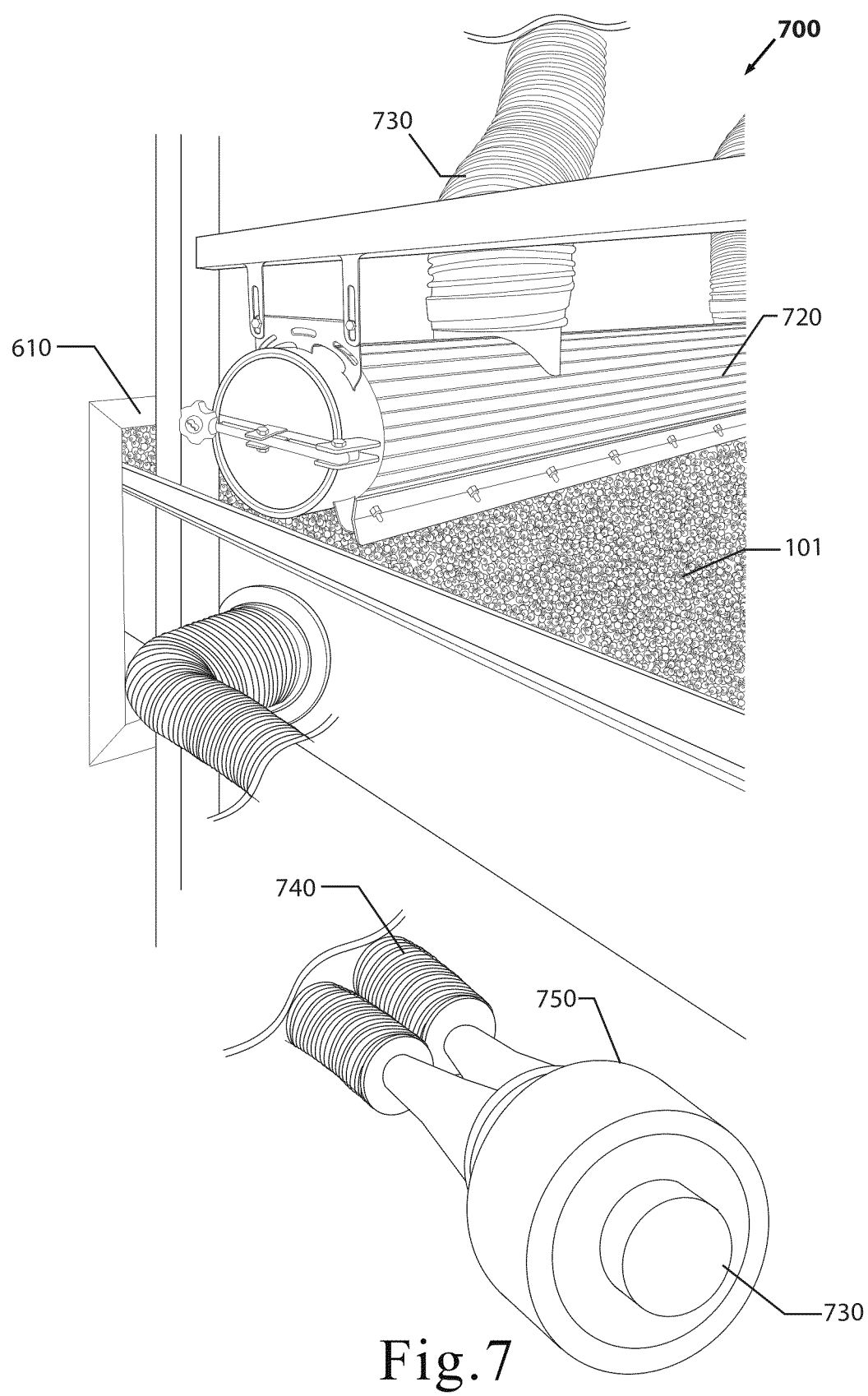
FIG. 7 is an illustration of one embodiment of the berry preparation device and shows the second drying portion.

FIG. 7 is an illustration of one embodiment of the berry preparation device and shows the second drying portion. The second drying portion 700 of device 200 is preferably in the second room 701 and may comprise: air blade dryers 720, tubes 730, powerful vacuums 750, motors 730, and vacuum tubes 740. The device 200 preferably moves the berries under air blade dryers 720 and above powerful vacuums 750. Preferably, the second drying portion 700 is in same configuration as first drying portion 600.

As shown in FIG. 7, the berries 101 first pass through a passage way or hole 610 in the wall and into the second room where they complete drying. The second room 701, which may also be the packaging room, is preferably 1-5° C. and is much less humid than the first room 201. The second drying portion provides the final mechanical drying of the berries and the low humidity of the room aids in the evaporative drying of the berries 101. The completely dry berries 101 are then discharged from the device 200.

Figure 8:
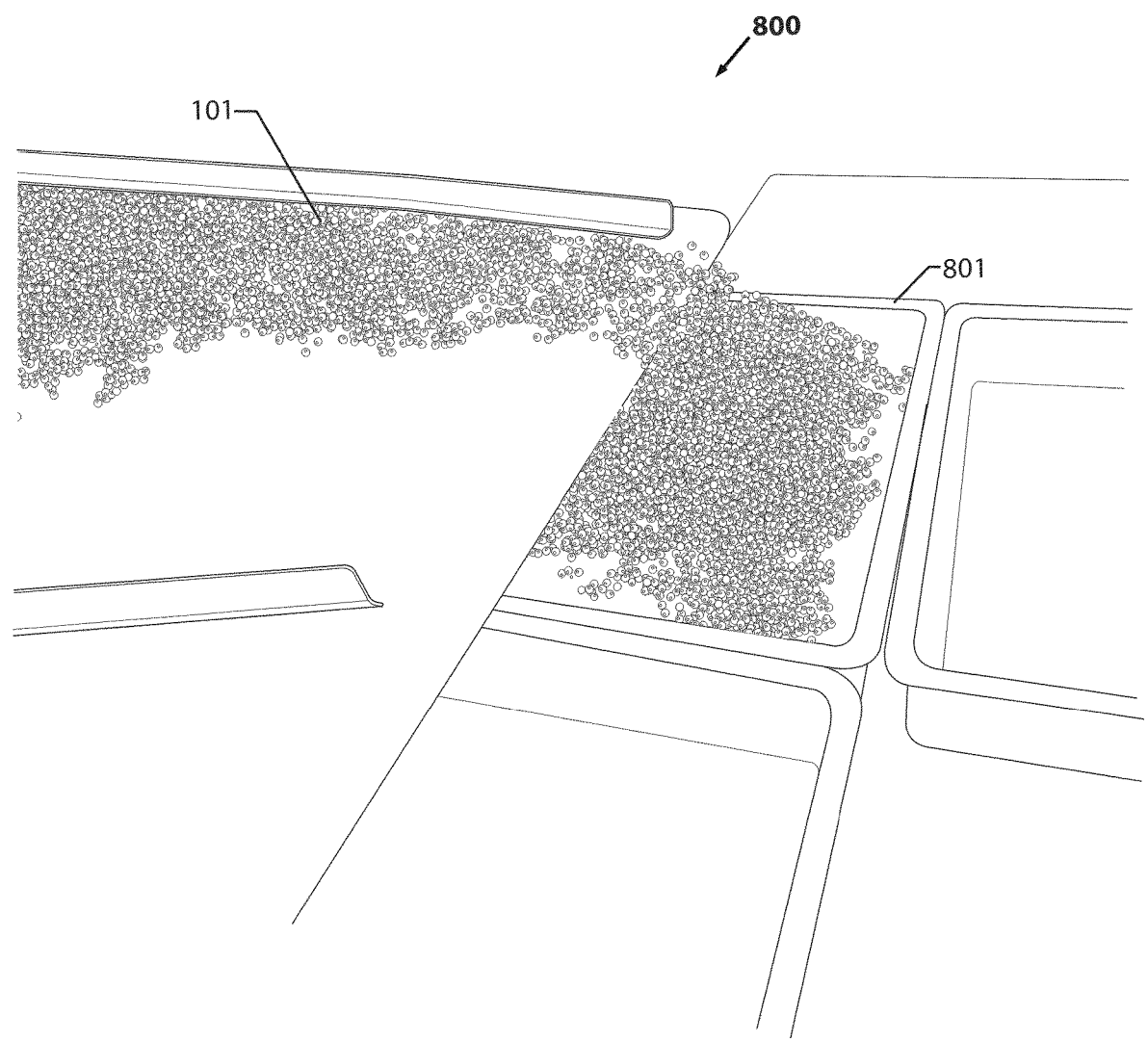
FIG. 8 is an illustration of one embodiment of the berry preparation device and shows the unloading portion.

FIG. 8 is an illustration of one embodiment of the berry preparation device and shows the unloading portion. As shown in FIG. 8, the berries 101 are preferably moved to the unloading portion 800. The berries 101 may then be finally inspected and gently placed into bins 801. The now dry berries are preferably ready to be packaged. If kept cool, blueberries washed and dried with this process may have a shelf-life of at least 21 days.

Throughout the entire processing, the berries 101 should be stored at or below 40 degrees Fahrenheit. After processing, the berries should remain at or below 40 degrees Fahrenheit (4.4 degrees Celsius) until delivered to the end user.

Each washing liquid is, preferentially, a sanitizing agent selected from classes of substances generally regarded as safe (GRAS) or which have been ascribed secondary food additive status as those terms are defined by the United States Food and Drug Administration in 21 C.F.R. §§ 178, 182, and 184. An important quality of the present device and method is the prevention of mechanical harm to the berries. Preventing the berries from harsh treatment and chemicals precludes damage to the skin of the berries and other harm that might cause premature degradation.

Other features and advantages are inherent in the berries washing method claimed and disclosed will become apparent to those skilled in the art from the following detailed description and its accompanying drawings.

Although the embodiments have been described in considerable detail with reference to certain preferred embodiments thereof, other embodiments or versions are possible. Therefore, the spirit and scope of the appended claims should not be limited to the description of the preferred embodiments contained herein.

The foregoing description of the preferred embodiment has been presented for the purposes of illustration and description. While multiple embodiments are disclosed, still other embodiments will become apparent to those skilled in the art from the above detailed description, which shows and describes illustrative embodiments. As will be realized, the blueberry washing device and methods are capable of modifications in various obvious aspects, all without departing from the spirit and scope. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

What is claimed is:

1. A berry preparation device comprising:
a first wash portion;
a second wash portion;
a tray removal device;
a third wash portion;
a first drying portion;
a second drying portion; and
a plurality of trays that are configured to hold a plurality of berries;
wherein said first wash portion comprises: a rain wash device, a solution spout, a rain sieve, an oxidizer sanitizer wash, a incoming pipe, a cover, a conveyor, one or more recirculation pipes, one or more legs, a controller, and a monitor;
wherein said first wash portion is configured to wash said plurality of berries in said oxidizer sanitizer wash;
wherein said plurality of trays are configured to move through said first wash portion, such that said plurality of berries are washed by said first wash portion within said plurality of trays;
wherein said oxidizer sanitizer wash is configured to be circulated out of said first wash portion, to a first chiller, and then recirculated back into said first wash portion, such that a temperature of said oxidizer sanitizer wash is kept between approximately 1-5° C.;
wherein said plurality of trays are configured to be moved from said first wash portion to said second wash portion;
wherein said second wash portion comprises: a structure, one or more sprayers, a sprayer support, a surfactant sanitizer wash, a source pipe, one or more recirculation pipes, a monitor, a controller, and legs;
wherein said second wash portion is configured to wash said plurality of berries in said surfactant sanitizer wash;
wherein said plurality of trays are configured to be moved through said second wash portion, such that said plurality of berries are washed by said second wash portion within said plurality of trays;
wherein said surfactant sanitizer wash is configured to be circulated out of the second wash portion, to a second chiller, and then recirculated back into said second wash portion, such that a temperature of said surfactant sanitizer wash is kept between approximately 1-5° C.;

wherein said plurality of trays are configured to be tipped over after said plurality of trays exit said second wash station, such that said plurality of berries are removed from said plurality of trays while creating a plurality of empty trays;

wherein said berry preparation device is configured to transport said plurality of berries to said third wash portion;

wherein said third wash portion comprises: a waterfall wash device;

wherein said third wash portion is configured to wash said plurality of berries in a final rinse sanitizer;

wherein said tray removal device is configured to automatically remove said plurality of empty trays;

wherein said berry preparation device is configured to automatically move said plurality of berries through said third wash portion, such that said plurality of berries pass under said waterfall wash device;

wherein said berry preparation device is configured to automatically move said plurality of berries from said third wash portion to said first drying portion;

wherein said tray removal device comprises: a tray decelerator, a tray tipper, a conveyor, a trough, and one or more legs;

wherein said berry preparation device is contained within two rooms, a first room and a second room;

wherein said first wash portion, said second wash portion, said third wash portion, and said first drying portion are within said first room;

wherein said second drying portion is within said second room; and wherein said plurality of trays are configured to be loaded into said berry preparation device.

2. The berry preparation device of claim 1, wherein said first drying portion comprises one or more vacuums and one or more air knife dryers;

wherein said one or more vacuums are below said plurality of berries and wherein said one or more air knife dryers are above said plurality of berries;

wherein said one or more vacuums are aligned with said one or more air knife dryers, such that each of said one or more vacuums is directly below one of said one or more air knife dryers;

wherein said one or more vacuums are configured to (a) remove a surface moisture from said plurality of berries, and (b) cradle said plurality of berries against said berry preparation device, such that said plurality of berries are prevented from being blown out of said berry preparation device by said one or more air knife dryers;

wherein said berry preparation device is configured to move said plurality of berries through said first drying portion, through a hole in a wall separating said first room and said second room, and then through said second drying portion;

wherein said second drying portion comprises one or more vacuums and one or more air knife dryers;

wherein said one or more vacuums and said one or more air knife dryers of said second drying portion have the same configuration as those in said first drying portion; and wherein placement of said second drying portion allows said plurality of berries to dry completely due to a lower humidity of said second room.

3. The berry preparation device of claim 2, wherein said berries are removed from said berry preparation device and packaged;

wherein said washed and dried plurality of berries are ready-to-eat and have a shelf life of at least 21 days;

wherein said plurality of berries are blueberries; and wherein said berry preparation device removes a bloom on said plurality of blueberries, such that said blueberries have an attractive appearance.

4. The berry preparation device of claim 1, wherein said first and second rooms are maintained as clean rooms and with positive pressure;

wherein a temperature of said first room is approximately 1-5° C.;

wherein said second room has a humidity that is lower than a humidity of said first room; and wherein a temperature of said second room is approximately 1-5° C.

5. The berry preparation device of claim 4, wherein said first drying portion comprises one or more vacuums and one or more air knife dryers;

wherein said one or more vacuums are below said plurality of berries and wherein said one or more air knife dryers are above said plurality of berries;

wherein said one or more vacuums are aligned with said one or more air knife dryers, such that each of said one or more vacuums is directly below one of said one or more air knife dryers;

wherein said one or more vacuums are configured to (a) remove a surface moisture from said plurality of berries, and (b) cradle said plurality of berries against said berry preparation device, such that said plurality of berries are prevented from being blown out of said berry preparation device by said one or more air knife dryers;

wherein said berry preparation device is configured to move said plurality of berries through said first drying portion, through a hole in a wall separating said first room and said second room, and then through said second drying portion;

wherein said second drying portion comprises one or more vacuums and one or more air knife dryers;

wherein said one or more vacuums and said one or more air knife dryers of said second drying portion have the same configuration as those in said first drying portion; and wherein placement of said second drying portion allows said plurality of berries to dry completely due to said lower humidity of said second room.

* * * * *